US008352702B2

(12) United States Patent
O'Neill et al.

(10) Patent No.: US 8,352,702 B2
(45) Date of Patent: Jan. 8, 2013

(54) DATA PROCESSING SYSTEM MEMORY ALLOCATION

(75) Inventors: Orlando O'Neill, Evanston, IL (US); Brian Paul Sobocinski, Austin, TX (US); Victor Anthony Garibay, Leander, TX (US); Natalie Ann Hawes, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 12/640,233

(22) Filed: Dec. 17, 2009

(65) Prior Publication Data

US 2011/0153971 A1    Jun. 23, 2011

(51) Int. Cl.
*G06F 12/02*    (2006.01)
(52) U.S. Cl. ......................................... 711/173; 711/165
(58) Field of Classification Search .................. None
See application file for complete search history.

(56) References Cited

U.S. PATENT DOCUMENTS

| 5,717,942 | A  |   | 2/1998  | Haupt              |         |
|-----------|----|---|---------|--------------------|---------|
| 6,321,373 | B1 |   | 11/2001 | Ekanadham          |         |
| 6,826,653 | B2 |   | 11/2004 | Duncan             |         |
| 6,874,076 | B2 |   | 3/2005  | Rogers             |         |
| 7,222,332 | B2 |   | 5/2007  | Gschwind           |         |
| 7,240,177 | B2 |   | 7/2007  | Hepkin             |         |
| 7,343,451 | B2 | * | 3/2008  | Suzuki et al.      | 711/114 |
| 7,484,208 | B1 | * | 1/2009  | Nelson             | 718/1   |
| 2005/0268065 | A1 |   | 12/2005 | Awada           |         |
| 2008/0235482 | A1 | * | 9/2008  | Armstrong et al. | 711/173 |
| 2010/0229175 | A1 | * | 9/2010  | Gonzalez et al.  | 718/104 |

OTHER PUBLICATIONS

Valeria Cardellini et al., "The State of the Art in Locally Distributed Web-Server Systems," ACM Computing Surveys, vol. 34, No. 2, Jun. 2002, pp. 263-311.
David Atienza et al., "Systematic Dynamic Memory Management Design Methodology for Reduced Memory Footprint," ACM Transactions on Design Automation of Electronic systems, vol. 11, No. 2, Apr. 2006, pp. 465-489, ACM Digital Library.
Xiaotong Zhaung et al., "A Framework for Parallelizing Load/Stores on Embedded Processors," Proceedings of the 2002 International Conference on Parallel Architectures and Compilation Techniques, PACT 2002, pp. 68-79, INSPEC AN-7503569.
Hubert Garavel et al., "Parallel State Space Construction for Model-Checking," SPIN 2001, LNCS 2057, pp. 217-234, 2001. ACM Digital Library.
Weiguang Shi et al., "Load Balancing for Parallel Forwarding," IEEE/ACM Transactions on Networking, vol. 13, No. 4, Aug. 2005, pp. 790-801, ACM Digital Library.

(Continued)

*Primary Examiner* — Gary Portka
(74) *Attorney, Agent, or Firm* — Thomas E. Tyson; Matthew B. Talpis (57) ABSTRACT

The present invention provides a data processing system with multiple logical partitions that isolate memory resources for applications contained in the logical partitions. A method is provided for moving a specific memory quantity between two logical partitions by first computing a threshold amount. Then, if the specific memory quantity to be transferred is less than the threshold amount, removing the threshold amount from memory assigned in the first partition and adding the threshold amount to memory assigned in the second partition. However, if the specific memory quantity is greater than the threshold amount, the method provides for removing an amount equal to the threshold from memory assigned in the first partition and adding that threshold amount to memory assigned in the second partition and repeating the removing and adding steps until the specific memory quantity has been transferred.

18 Claims, 6 Drawing Sheets

OTHER PUBLICATIONS

Xavier Rival., "Symbolic Transfer Fuction-based Approaches to Certified Compilation," POPL 2004, Jan. 14-16, 2004, Venice, Italy, 13 pages, ACM Digital Library.

Jahangir Hasan et al., "Efficient Use of Memory Bandwidth to Improve Network Processor Throughput," 12 pages, ACM Digital Library.

Timonthy Sherwood et al., "A Pipelined Memory Architecture for High Throughput Network Processors," 12 pages, ACM Digital Library.

"LPAR," article from Wikipedia, http://en.wikipedia.org/wiki/Logical_partition, 2 pages, retrieved Nov. 15, 2009.

"Dynamic Logical Partitioning," article from Wikipedia, http://en.wikipedia.org/wiki/DLPAR, 1 page, retrieved Oct. 15, 2009.

J. Jann et al., "Dynamic reconfiguration: Basic building blocks for autonomic computing on IBM pSeries servers," IBM Systems Journal, vol. 42, No. 1, 2003, pp. 29-37.

"Dynamic Logical Partitioning in IBM eserves pSeries," IBM white paper, Oct. 8, 2002, available from http://www-03.ibm.com/systems/p/hardware/whitepapers/dipar.html, retrieved Nov. 21, 2009.

\* cited by examiner

Figure 9

DATA PROCESSING SYSTEM MEMORY ALLOCATION

BACKGROUND OF THE INVENTION

The present invention relates to data processing systems. In particular, the present invention relates to data processing systems executing multiple applications with allocated memory.

As data processing technology advances, current data processing systems provide for the performance of many different programs simultaneously while allocating hardware resources such as memory among these programs.

One system that currently exists for allocating the digital processing system's resources is termed a logical partition (LPAR). A logical partition is a virtualization that provides separate virtual computer environments that are, in reality, all executing on a single physical data processing system. In operation, an application executing in one logical partition would not be able to directly affect the performance of a second program executing in a second logical partition even though both programs may be executing at the same time on the same data processing system using portions of the same physical memory array. Obviously logical partitions offer lower costs and are more convenient than running two applications on separate data processing systems. In addition, because logical partitions offer application isolation, they provide a very secure environment for programs to execute.

SUMMARY

In accordance with the present invention, a data processing system that includes at least two logical partitions provides a method of moving a specific memory quantity between two logical partitions by first computing a threshold amount. Then, if the specific memory quantity is less than the threshold amount, removing the threshold amount from memory assigned in the first partition and adding the threshold amount to memory assigned in the second partition. If the specific memory quantity is greater than the threshold amount, removing an amount equal to the threshold from memory assigned in the first partition and adding that threshold amount to memory assigned in the second partition and repeating the removing and adding steps until the specific memory quantity has been transferred.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the present disclosure and should not be taken to be limiting of the invention itself. Rather, any number of variations may fall within the scope of the invention, which is defined in the claims following the description.

The present invention is a method, system, and computer program product that provides for the reallocation of memory in a data processing system having multiple logical partitions isolating memory resources for applications contained in each of the logical partitions. The isolation of hardware resources in a data processing system to applications contained within a logical partition is very useful. Dynamic logical partitioning for the pSeries computing devices is described in a white paper entitled "Dynamic Logical Partitioning in IBM eserver pSeries," International Business Machines Corporation, Oct. 8, 2002, available from International Business Machines Corporation at http://www-03.ibm.com/systems/p/hardware/whitepapers/dlpar.html, and retrieved on Nov. 21, 2009 which is hereby incorporated by reference.

However, in a situation where one application in one logical partition is not using its assigned resources and another application in a different logical partition needs these unused resources, the logical partition protections provide an obstacle for the reallocation of these hardware resources. To address the issues of reallocation and particularly the issues of autonomic reconfiguration, a dynamic logical partition (DLPAR) structure has been provided which is discussed in an article entitled "Dynamic reconfiguration: Basic building blocks for autonomic computing on IBM pSeries servers" by J. Jan, L. M. Browning, and R. S. Burugula published in the *IBM System Journal*, volume 42, number 1, pages 29-37, 2003 and is herein incorporated by reference. Yet, even with the reconfiguration advantages of DLPAR, reallocating memory resources between applications in different logical partitions is burdensome. This is because the isolation and protection provisions of a logical partition must be negotiated.

According to the process for a logical partition memory transfer, a memory block of a specific amount of memory must be first completely removed from one logical partition before it can be reallocated to a different logical partition. In other words, all of the memory removal from a logical partition must be complete before the memory can be reallocated to a different logical partition. An embodiment of the present invention provides a technique to provide memory more efficiently by executing this memory transfer in smaller amounts over time.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction implementation system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction implementation system, apparatus, or device.

Program code embodied on a computer readable medium may be transmitted using any appropriate medium, including but not limited to wireless, wire line, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may be implemented entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are implemented via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which are implemented on the computer or other programmable apparatus provide processes for implementing the functions/acts specified in the flowchart and/or block diagram block or blocks.

Figure 1:
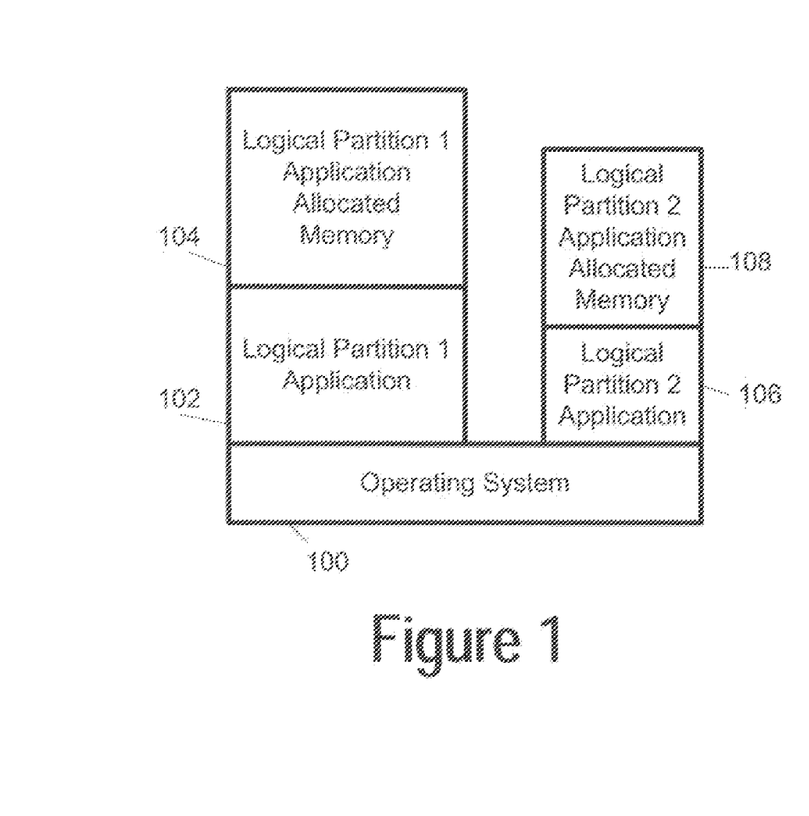
FIG. 1 is a block diagram illustrating a digital processing system including two logical partitions with two independent memory allocations for applications.

FIG. 1 is a block diagram that illustrates two logical partitions in a data processing system. The management of the logical partitions is accomplished by the operating system 100. In one logical partition 102, an application resides that includes an allocated memory 104. In a separate logical partition 106, a second application resides with a separate amount of allocated memory 108. It should be understood that memory 104 and memory 108 may be part of the same physical memory array but that each are isolated from applications in other logical partitions by the operating system enforcing the logical partition infrastructure.

Figure 2:
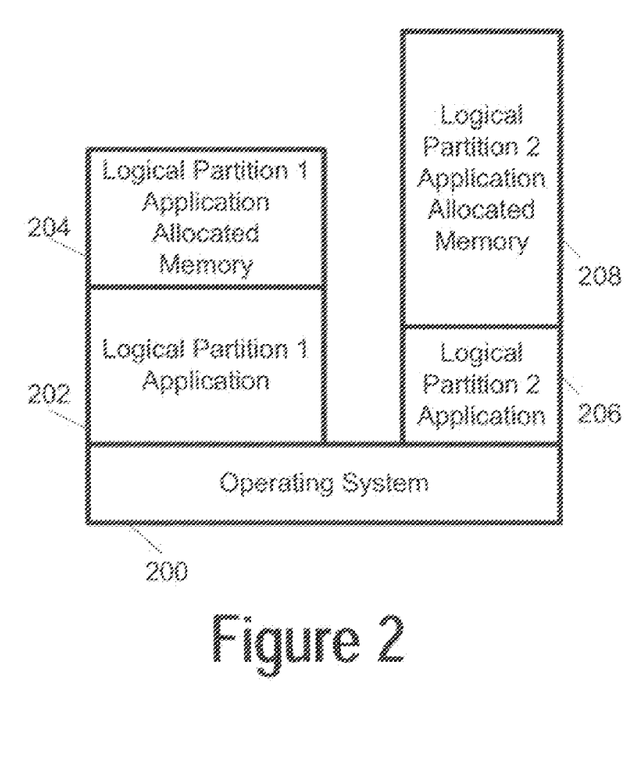
FIG. 2 is a block diagram illustrating a digital processing system having the two logical partitions of FIG. 1 with different amounts of memory allocated between the two applications of the two logical partitions.

FIG. 2 illustrates the same two logical partitions but with different amounts of memory allocated between the applications as compared to FIG. 1. In this example, the application 202 has a smaller amount of memory allocated 204 than in FIG. 1 and the application 206 has more memory allocated 208 than in FIG. 1. This would occur when the requirements for memory resources by the application in the first logical partition are reduced at the same time that the requirement for memory resources in the second application 206 are being increased. An example would be a program servicing one geography versus another program servicing another geography where the time zone differences would result in memory resource requirements at different times. In other words, different times for peak demands in programs in different logical partitions would routinely require memory resource reallocation.

Figure 3:
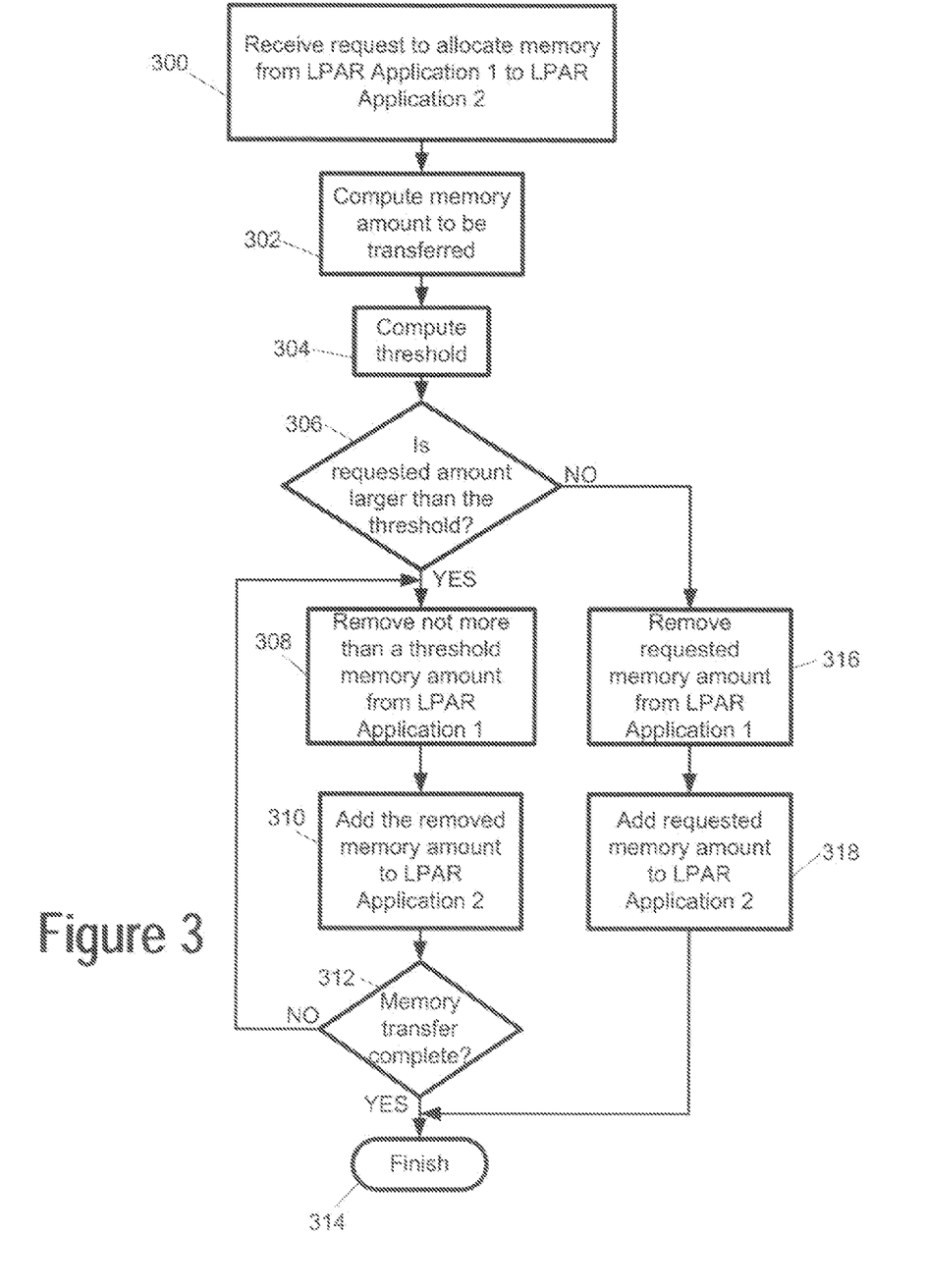
FIG. 3 is a software flow chart illustrating the reallocation of memory between applications in two separate logical partitions.

FIG. 3 is a software flowchart illustrating an embodiment of the present invention that provides for a more efficient transfer of memory between applications in different logical partitions. The software illustrated in FIG. 3 resides in the operating system or in that part of the operating system that supervises the operation of the logical partitions. In step 300, the program receives the request to reallocate memory from an application in one logical partition to an application in another logical partition. In step 302, the specific amount of memory to be transferred is computed. In step 304, a threshold amount would be computed. In the preferred embodiment, the threshold amount is computed as a fraction of the specific amount of memory to be transferred. However, the threshold will not be less than some minimum memory transfer amount. In one embodiment, the fraction is 0.20 (or 20% of the specific memory for transfer) and the minimum amount is the minimum unit amount of memory for transfer which is usually a memory block size of 256 M or 512 M of memory. In another embodiment, the threshold amount is computed as a step function such that memory transfer amounts within different ranges will have threshold amounts for that range. One example provides a memory transfer amount up to 10 GB will have a threshold of 2 GB, a memory transfer amount greater than 10 GB but less than or equal to 100 GB would have threshold of 5 GB and so on. In step 306, the program determines whether or not the amount of memory to be transferred is greater than the threshold amount. If not, the program proceeds to step 316 to remove the total memory amount to be transferred from the first logical partition. Once this memory removal has been completed, the memory is then added or reassigned to the application in the second logical partition in step 318. Upon completion, the process is finished in step 314. Returning to step 306, if the amount to be transferred is larger than the threshold amount, the program proceeds to step 308 to remove at least a threshold amount from the first logical partition. Once this amount has been removed, then that amount is added to the second logical partition in step 310. At that point, in step 312, the program determines whether all the memory to be transferred has been transferred. If not, the program returns to step 308 to remove another threshold memory amount from the first logical partition and then step 310 is repeated. For a memory reallocation of an amount of greater than the threshold amount, several remove/add operations will occur. However, the last remove/add operation may only require a small amount of memory that is less than the threshold amount to be transferred. In that case, only this remaining amount of memory will be transferred. Once the memory transfer has been determined to be complete in step 312, the program finishes in step 314.

Figure 4:
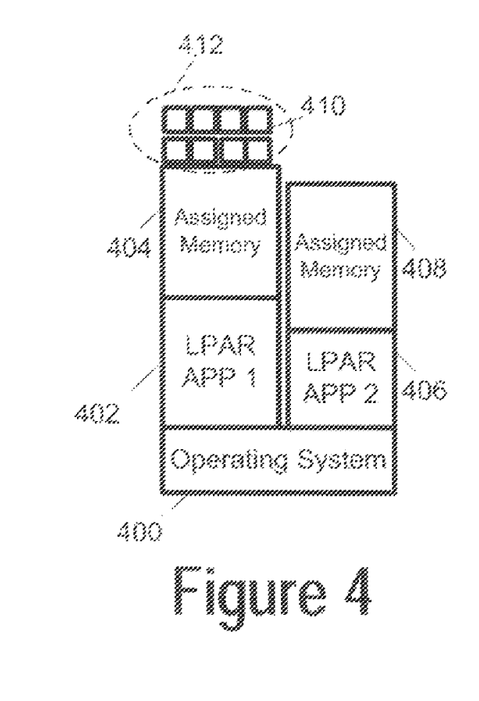
FIGS. 4, 5, 6, 7 and 8 are block diagrams illustrating the successive reallocation of memory between the applications of two separate logical partitions according to the teaching of the present invention.

FIGS. 4, 5, 6, 7 and 8 are block diagrams illustrating the memory transfer between an application in a first logical partition and an application in the second logical partition. Referring to FIG. 4, the operating system 400 contains two logical partitions. The first logical partition contains an application 402 that has assigned memory 404 which is being used and other assigned memory 412 which is not being utilized. A second logical partition includes an application 406 having assigned memory 408 that is being utilized. It is desired to transfer the memory amount 412 to the application 406 in the second logical partition. Memory 412 is shown as eight blocks of individually addressable and transferrable memory such as block 410. In accordance with the preferred embodiment of this invention, a single set of four blocks such as block 410 are initially removed rather than removing all eight blocks. Since removing four blocks will require less time than removing all of the unused blocks, some unused memory will be able to be reassigned or reallocated to the application requiring this additional resource more quickly even though not all of the memory requested has been reallocated. However, in most cases, the application requiring the new resource can still take advantage of this partial memory reallocation immediately.

Figure 5:
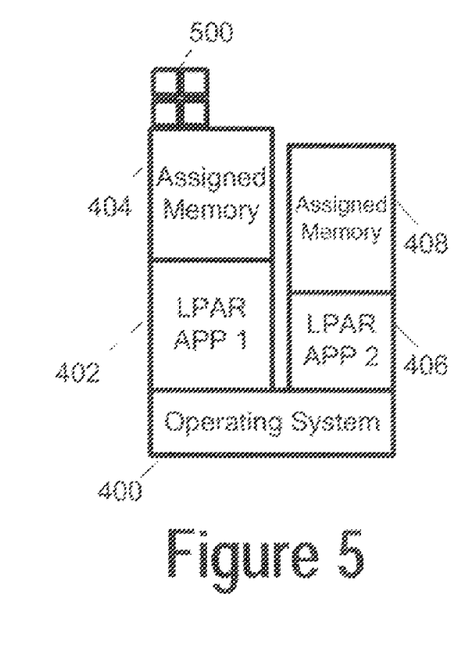

In FIG. 5, memory blocks 500 illustrate that half of the memory to be reallocated has been removed and half remains. In other words, four blocks of memory have not yet been transferred to the application in the second logical partition but these four blocks of memory have been removed from the application in the first partition.

Figure 6:
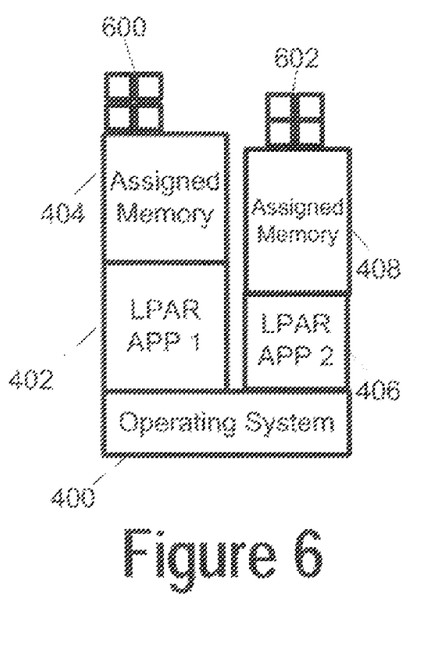

In FIG. 6, the four blocks of memory 602 have been allocated to the application in the second logical partition while the four blocks of memory 600 still remain assigned to the application in the first logical partition.

Figure 7:
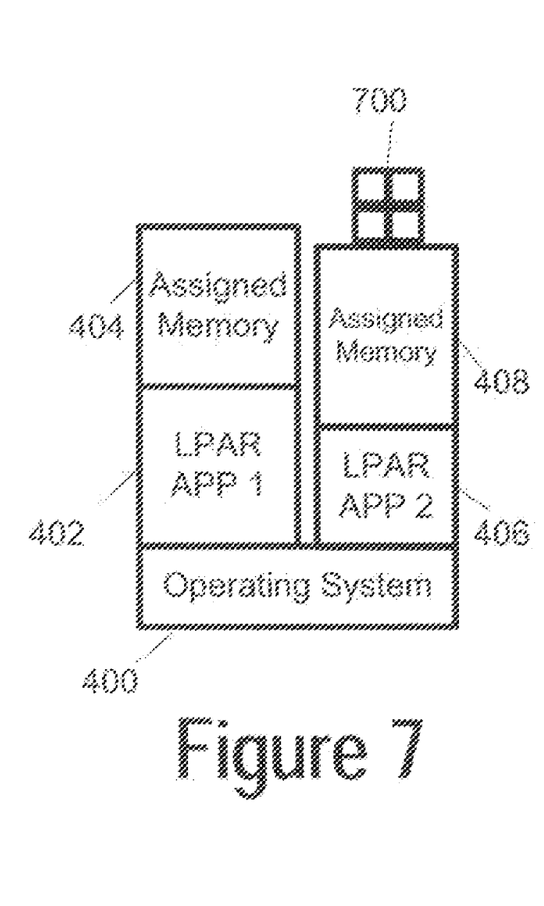

In FIG. 7, the last four blocks of unassigned memory in the first logical partition have been removed. The four blocks that have been assigned previously to the application in the second logical partition still remain.

Figure 8:
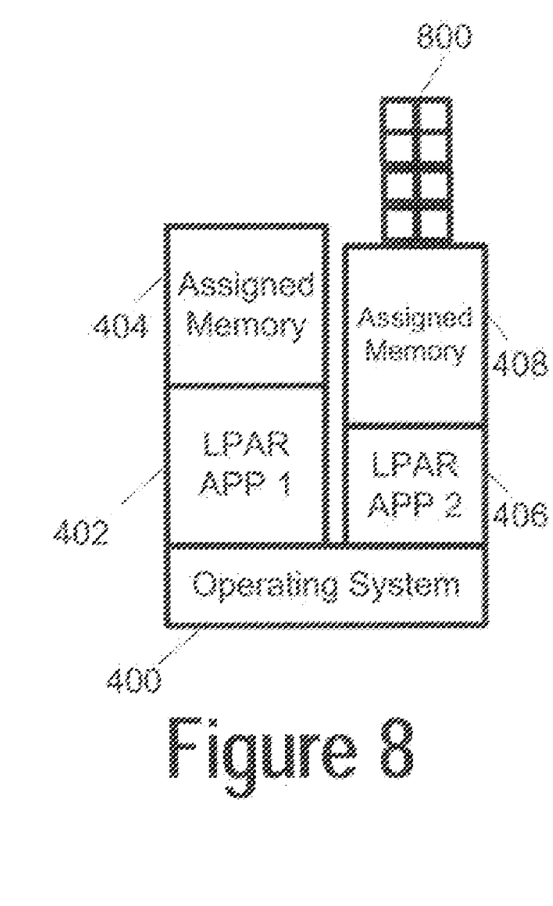

Lastly, in FIG. 8, all eight blocks of memory 800 are shown to be assigned to the application in the second logical partition.

While it might appear that the preferred embodiment method would not be as efficient as removing all of the memory from the first logical partition and then adding all of this memory to the second logical partition, in reality, the increased size of memory to be transferred requires more time for removal and addition. One reason is that the amount memory to be removed is often fragmented and the operating system or memory manager will have to defragment the memory in order to provide a contiguous memory portion for the transfer. Smaller amounts of memory to be transferred mean smaller amounts of memory that need to be defragmented. Therefore, by reducing the size of memory being transferred and increasing the number of transfers, the memory that is needed by the application in the second logical partition will be provided more quickly enabling that application to uses memory more efficiently. In one example, a memory move from one logical partition to another took approximately 12 hours. Implementing this invention can improve this operation by reducing the time by up 75% resulting in a significant time savings The amount of time saved will vary according to operating conditions such as the system load, the amount of memory to be transferred, etc.

Since the application in the second partition is in need of the additional memory, usually needing this memory as soon as possible, even if the time for the total memory transfer is longer because of the greater number of smaller memory quantity transfers versus a single large memory transfer, the reality is that the program receiving the smaller amounts sooner is able to execute more effectively with these smaller memory amounts being assigned more quickly.

Figure 9:
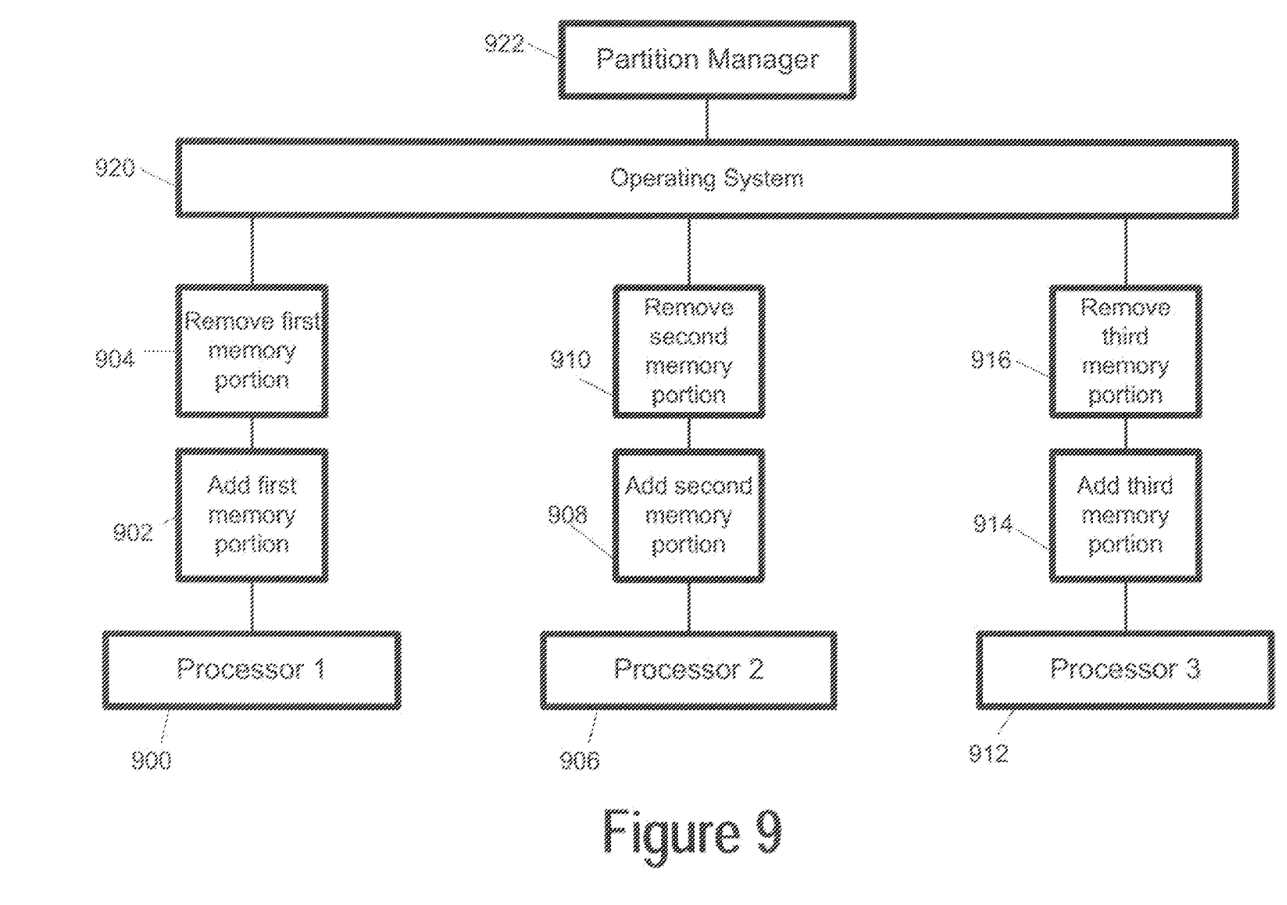
FIG. 9 is a block diagram illustrating the simultaneous performance of memory allocation tasks across three processors.

FIG. 9 is a block diagram illustrating that the division of removal/addition memory operations into several memory tasks implemented in a multiprocessing system can actually increase the time efficiency for the transfer of memory since smaller block transfers may occur substantially simultaneously. Referring to FIG. 9, under the supervision of a partition manager program of instructions 922 which, in the preferred embodiment resides above an operating system 920, a first memory portion removal task 904 followed by a task adding that first memory portion 902 can be accomplished in processor 900 at the same time removal task 910 and adding task 908 is being performed in processor 906 and at the same time the removal task 916 and adding task 914 are executing in processor 912. Therefore, the transfer of a number of smaller units will provide a faster transfer than the transfer of a larger unit of memory since these smaller transfers are independent from each other.

Figure 10:
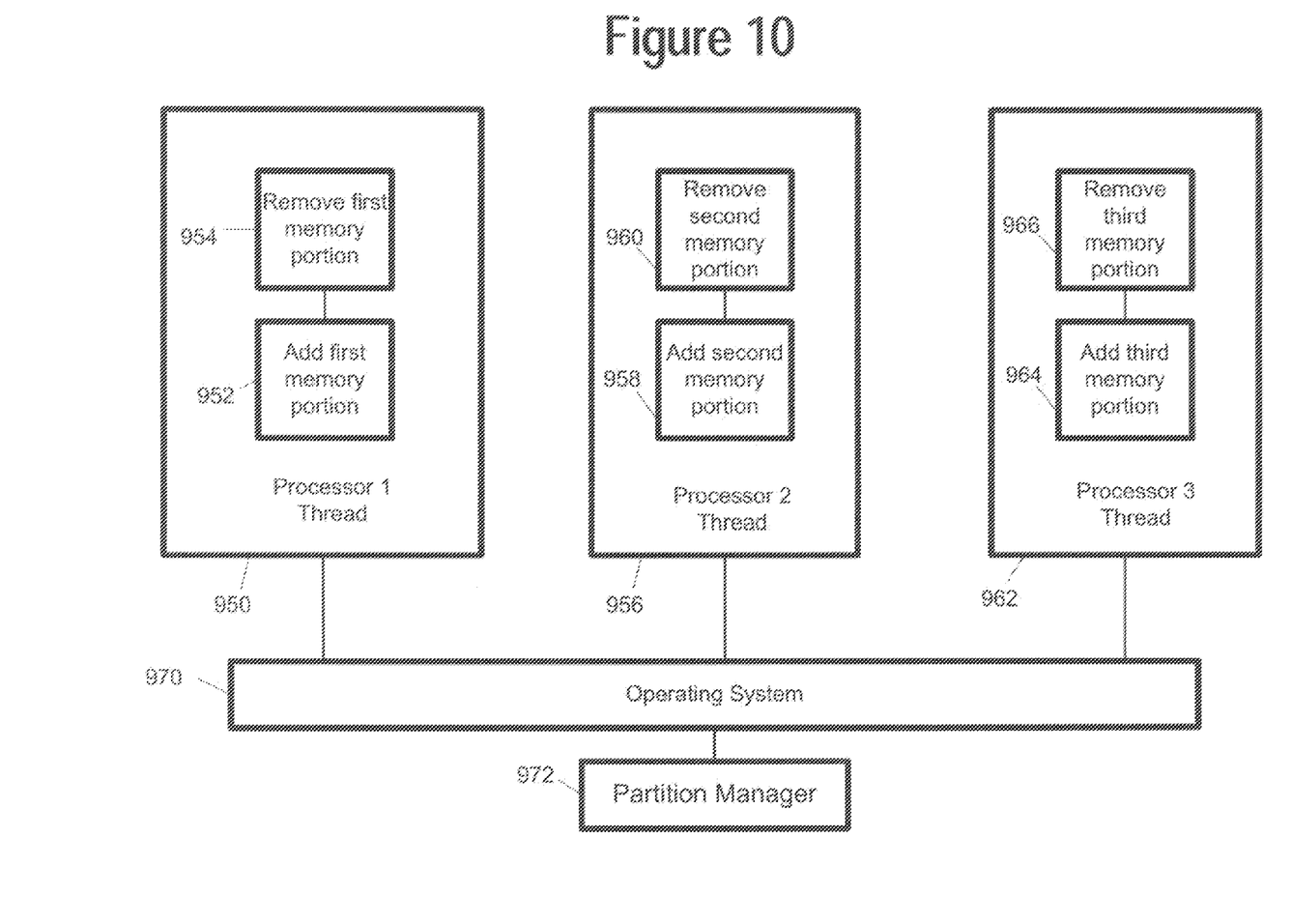
FIG. 10 is a block diagram illustrating the simultaneous performance of memory allocation tasks across three processor threads.

In FIG. 10, multiple transfers can be made in a multi-threaded data processing system where the partition manager 972 directs the operating system 970 to provide in a first processor thread 950, the removal of a first portion of memory from the first partition in a task 954 followed by the adding of the first portion of memory to the second partition while, in a second processor thread 956, a second memory portion is removed from the first partition in task 960 and that second memory portion is added to the second memory partition in task 958 and, while, in a third processor thread 962, a third memory portion is removed from the first partition in task 966 and that third memory portion is added to the second memory partition in task 964. Again, these threads 950, 956, 962 are independent from each other and may be performed in overlapping time periods which would result in increased memory management efficiency.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims may contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The invention claimed is:

1. In a data processing system including at least two logical partitions, a method of moving a specific memory quantity between two logical partitions comprising:
computing a threshold amount based upon the specific memory quantity to be moved, wherein the threshold amount is computed by multiplying the specific memory quantity by a predetermined fraction that is less than 1 but greater than 0 and determining if a minimum memory transfer unit amount is greater than the threshold amount, and if so, setting the threshold amount to the minimum memory transfer unit amount;
if the specific memory quantity is less than the threshold amount, removing the threshold amount from memory assigned in the first logical partition and adding the threshold amount to memory assigned in the second logical partition, and
if the specific memory quantity is greater than the threshold amount, removing an amount equal to the threshold amount from memory assigned in the first logical partition and adding that threshold amount to memory assigned in the second logical partition and repeating the removing and adding operations until the specific memory quantity has been transferred.

2. A method according to claim 1 wherein when multiple removing and adding operations are required, assigning each removing and adding pair operation to a separate processor thread in the data processor.

3. A method according to claim 1 wherein when multiple removing and adding operations are required, executing each removing and adding pair operation to a separate processor in the data processor.

4. A method according to claim 3 wherein said multiple removing and adding pair operations are performed simultaneously.

5. A method according to claim 1 wherein when multiple removing and adding operations are required, assigning each removing and adding pair operation to a separate processor thread in the data processor.

6. A method according to claim 1 wherein when multiple removing and adding operations are required, executing each removing and adding pair operation to a separate processor in the data processor.

7. A method according to claim 3 wherein said multiple removing and adding pair operations are performed simultaneously.

8. A computer program product stored in a computer operable media, the computer operable media containing instructions for running by a computer, which, when run by the computer, causes the computer to implement a method, in a data processing system having at least two logical partitions, for moving a specific memory quantity between two logical partitions and comprising the steps of:
computing a threshold amount based upon the specific memory quantity to be moved wherein the threshold amount is computed by multiplying the specific memory quantity by a predetermined fraction that is less than one but greater than 0 and determining if a minimum memory transfer unit amount is greater than the threshold amount, if so, setting the threshold amount to the minimum memory transfer unit amount;
if the specific memory quantity is less than the threshold amount, removing the threshold amount from memory assigned in the first logical partition and adding the threshold amount to memory assigned in the second logical partition, and
if the specific memory quantity is greater than the threshold amount, removing an amount equal to the threshold amount from memory assigned in the first logical partition and adding that threshold amount to memory assigned in the second logical partition and repeating the removing and adding operations until the specific memory quantity has been transferred.

9. A computer program product according to claim 8 wherein said fraction is equal to twenty percent.

10. A computer program product according to claim 8 wherein when multiple removing and adding operations are required, assigning each removing and adding pair operation to a separate processor thread in the data processor.

11. A computer program product according to claim 8 wherein when multiple removing and adding operations are required, executing each removing and adding pair operation in a separate processor in the data processor.

12. A computer program product according to claim 11 wherein said multiple removing and adding pair operations are performed simultaneously.

13. A computer program product according to claim 8 wherein said fraction is equal to twenty percent.

14. A data processing system comprising;
at least one processor for executing instructions;
a memory for storing data and instructions;
an operating system program of instructions residing in the memory and including instructions to provide a first and second logical partition wherein each partition operates independently of the other and to assign a portion of the memory to the first and to the second logical partition; and
a memory manager program of instructions residing the in the memory and including instructions to compute a threshold amount based upon a specific memory quantity to be moved, wherein the threshold amount is computed by multiplying the specific memory quantity by a predetermined fraction that is less than 1 but greater than 0 and determining if a minimum memory transfer unit amount is greater than the threshold amount, and if so, setting the threshold amount to the minimum memory transfer unit amount, and, if the specific memory quantity is less than the threshold amount, to remove the threshold amount from memory assigned in the first partition and add the threshold amount to memory assigned in the second partition, or if the specific memory quantity is greater than the threshold amount, to remove an amount equal to the threshold from memory assigned in the first partition and add that threshold amount to memory assigned in the second partition and repeat the removing and adding operations until the specific memory quantity has been transferred.

15. A data processing system according to claim 14 further including memory manager instructions to assign any multiple removing and adding pair operations to separate processor threads in the data processor.

16. A data processing system according to claim 14 wherein said data processor includes at least two processors and memory manager instructions to assign any multiple removing and adding pair operations to separate processors of the data processor.

17. A data processing system according to claim 16 wherein said multiple removing and adding pair operations are performed simultaneously in the separate processors of the data processor.

18. In a data processing system including at least two logical partitions, a method of moving a specific memory quantity between two logical partitions comprising:
computing a threshold amount based upon the specific memory quantity to be moved, the specific memory quantity being compared to a table having a plurality of memory transfer ranges wherein each memory transfer range designates a threshold amount for that memory transfer range and determining a threshold amount from the table;
if the specific memory quantity is less than the threshold amount, removing the threshold amount from memory assigned in the first logical partition and adding the threshold amount to memory assigned in the second logical partition, and
if the specific memory quantity is greater than the threshold amount, removing an amount equal to the threshold amount from memory assigned in the first logical partition and adding that threshold amount to memory assigned in the second logical partition and repeating the removing and adding operations until the specific memory quantity has been transferred.

* * * * *